W. S. BURGESS.
COMPRESSION COUPLING.
APPLICATION FILED JAN. 13, 1908.
906,099.
Patented Dec. 8, 1908.
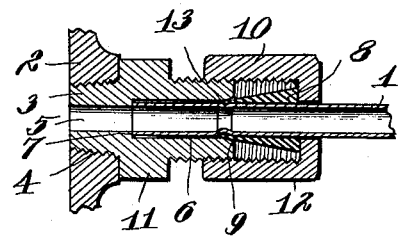
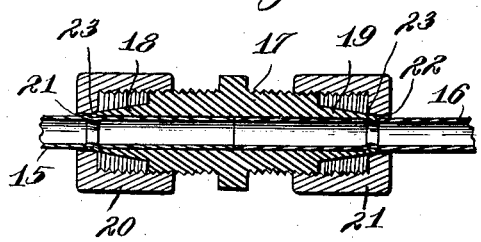
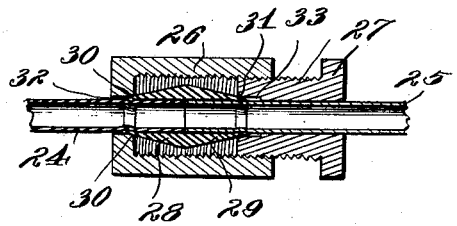
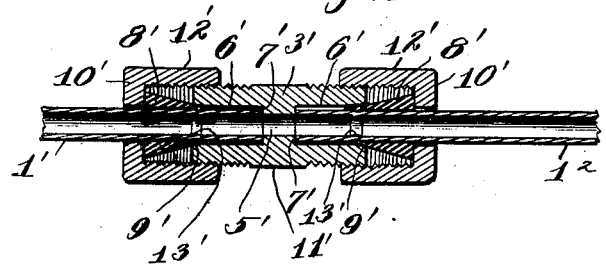
Witnesses:
Inventor
Walter S. Burgess,
By Geo. E. Waldo,
Atty

UNITED STATES PATENT OFFICE.

WALTER S. BURGESS, OF CHICAGO, ILLINOIS.

COMPRESSION-COUPLING.

No. 906,099.　　　Specification of Letters Patent.　　　Patented Dec. 8, 1908.

Application filed January 13, 1908. Serial No. 410,520.

*To all whom it may concern:*

Be it known that I, WALTER S. BURGESS, a citizen of the United States, and a resident of Chicago, in the county of Cook and State of Illinois, have invented certain new and useful Improvements in Compression-Couplings, of which the following is a specification.

This invention relates to pipe or wire unions or couplings.

The object of the invention is to provide a union or coupling for connecting a pipe or rod to any desired structure, or sections of a pipe or of a rod to each other, without the use of soldered or brazed joints, which will be simple, strong and relatively cheap in construction; by means of which the coupling or union may be quickly and conveniently made; and which will be effective for its designed purpose, forming a strong and secure joint.

To effect these ends, a union or coupling of my invention comprises the various features, combinations of features and details of construction hereinafter described and claimed.

In the accompanying drawings, in which my invention is fully illustrated—Figure 1 is a sectional view of a union of my invention, shown as applied for connecting a pipe to a separate structure. Fig. 2 is a sectional view of a coupling embodying my invention, shown as applied for connecting sections of a pipe to each other; and Figs. 3 and 4 are sectional views of modified forms of coupling embodying my invention.

Referring now particularly to Fig. 1 of the drawings, in which my invention is shown as embodied in a union adapted for connecting a pipe 1 to any desired structure, represented at 2, as the wall of a tank or reservoir, 3 designates a bushing permanently secured in the structure 2, as shown by means of a pipe thread 4 screw threaded into a corresponding opening in said structure 2. Formed through said bushing 3, is a hole or opening 5 of the same size as the bore of the pipe or tube 1. At its outer end, said hole or opening 5 is enlarged to a size slightly larger than the exterior diameter of said pipe or tube 1, as shown at 6, thus forming a recess having a shoulder 7 at its inner end against which the end of the pipe 1 is intended to abut and which defines the desired position of said pipe relative to the members of the union.

Placed over the end of the pipe or tube 1 is a tapered sleeve or ring 8, of suitable ductile material, as brass or copper, the small end of which is disposed towards the end of said pipe or tube which is designed to be inserted into the bushing 3, the relation being such that the small end of said sleeve or ring 8 will enter the open end of the recess 6 in said bushing a short distance, say from 1/32 to 1/16 of an inch before the tapered surface thereof contacts with the edges of said recess 6. In order to prevent the edges of said recess 6 from cutting into the surface of the sleeve or ring 8, the edges of said bushing around the open end of said recess are preferably rounded or chamfered, as shown at 9.

The small end of the tapered sleeve or ring 8 is adapted to be forced into the opening 6 by means of a recessed nut 10 screw threaded to the outer end of the bushing 3, the inner end of which is adapted to abut or bear against the large end of said sleeve or ring 8.

To provide for conveniently screwing the bushing 3 into the structure 2 and for tightening the nut 10, said bushing is provided with a hexagonal section 11 and the exterior surface 12 of said nut is made hexagonal, in order that they may be grasped by a wrench. In order that said sleeve or ring 8 and the nut 10 may move freely along the pipe or tube 1, regardless of slight variations in the diameter thereof, the holes or openings in said sleeve or ring and in said nut through which said pipe or tube passes, are preferably made slightly larger than the exterior diameter of said pipe or tube. In the case of the sleeve or ring 8, this difference will be slight, say 5/1000 of an inch, but in the case of the nut 10, it may be greater, the only limitation being that a sufficient shoulder be left at the inner end of said nut to afford a proper bearing for the end of said sleeve or ring 8.

In connecting the union, the nut 10 and sleeve or ring 8 are first placed over the end of the pipe or tube 1. The end of said pipe is then inserted into the open end of the bushing 3 until the end thereof abuts against the shoulder 7 at the end of the recess 6 therein. The thread of the nut 10 is then engaged with the thread on the bushing 3 and said nut is screwed up until the small end of the sleeve or ring 8 is forced into strong engagement with the rounded edge 9 at the outer end of the recess 6 in said bushing 3, said nut 10 being preferably turned or set up until the pressure on said tapered sleeve or ring 8 is sufficient to cause the rounded edge 9 of the bushing 3 to swage an interior bead on said sleeve or ring 8, which will in turn swage a corresponding groove in the external surface of the pipe or tube 1, as shown at 13. Said bead being interlocked with said groove, will operate in an obvious manner to prevent the pipe or tube 1 from being withdrawn from the bushing 3.

Where connections of less strength are required, the pipe or tube 1 may be secured in position merely by frictional engagement of the sleeve or ring 8 therewith, without the formation of the interlocking bead and groove 13.

A coupling of my invention, which, as shown in Fig. 2, is applied for connecting the sections $1^1$ and $1^2$ of a pipe to each other, may be described, generally, as a mere duplication of the union shown in Fig. 1 and heretofore described, comprising a member $3^1$ provided with an axial hole or opening $5^1$ of substantially the interior diameter of the pipe sections $1^1$ and $1^2$, said hole or opening $5^1$ being enlarged at both ends to a size slightly larger than the external diameter of the pipe sections $1^1$ and $1^2$, thus forming recesses $6^1$ having interior shoulders $7^1$ at their inner ends, which define the desired positions of the pipe sections $1^1$ and $1^2$, relatively to the members of the coupling. Placed over the ends of the pipe sections $1^1$ and $1^2$, are tapered rings or sleeves $8^1$, the small ends of which are adapted to be forced into the ends of the recesses $6^1$ in the member $3^1$ by means of recessed nuts $10^1$ threaded to the opposite ends of said member $3^1$ with the inner ends of said recesses abutting or bearing against the large ends of the sleeves or rings $8^1$. The member $3^1$ comprises a hexagonal section $11^1$ and the exterior surfaces $12^1$ of the nuts $10^1$ are made hexagonal to provide for conveniently grasping the same with a wrench.

By forcing the tapered sleeves or rings $8^1$ against the rounded edges $9^1$ at the outer ends of the recesses $6^1$ in the member $3^1$, said sleeves $8^1$ and the pipe sections $1^1$ and $1^2$ may be swaged to form interlocking beads and grooves shown at $13^1$.

While I consider the form of union or coupling shown in Figs. 1 and 2 as embodying my invention in its preferable form, I do not desire to limit myself thereto, as the invention admits of various modifications. Two different modifications are shown in Figs. 3 and 4 of the drawings, which I will now describe.

The modified form of union or coupling shown in Fig. 3 as applied for connecting the sections 15 and 16 of a pipe or wire to each other, comprises a member 17 formed integral with the opposite ends of which are tapered sections 18 and 19, which correspond to the sleeve or ring $8^1$, Fig. 2.

The member 17 and the tapered end portions 18 and 19 thereof are provided with a longitudinal hole or opening adapted to receive the parts 15 and 16 to be connected or coupled, and threaded to the ends of the members 17 are recessed members 20 and 21, which are provided with holes or openings 22 of such size that the small ends of the tapered end portions 18 and 19 of the member 17 will enter said holes or openings a short distance so that the edges of said holes or openings will engage the tapered surfaces of said sections 18 and 19 a short distance from their small ends, the edges of said holes or openings designed to contact with said tapered sections 18 and 19 being preferably rounded or chamfered, as shown at 23, in order that they may not cut said tapered sections 18 and 19.

By screwing up the members 20 and 21, the rounded edges 23 of the holes or openings 22 therein will operate to swage interior beads on the tapered end sections 18 and 19 of the member 17 and corresponding grooves on the members 15 and 16, which it is desired to connect, with which said beads will interlock, thus securing said members 15 and 16 against endwise movement relatively to the members of the coupling, all substantially in the manner heretofore described in connection with the preferred form of the device.

The modified form of union or coupling shown in Fig. 4 as applied for connecting the sections 24 and 25 of a pipe or wire to each other, comprises members 26 and 27, the member 27 being screw threaded to a suitable recess formed in the member 26.

Placed over the ends of the members 24 and 25 to be connected, is a sleeve comprising oppositely tapered sections 28 and 29, the small ends of which are respectively adapted to engage the rounded edges 30 and 31 of a hole or opening 32 in the member 26 and of a recess 33 in the member 27.

With this construction, it is obvious that when the members 26 and 27 are screwed up, the engagement of the rounded edges 30 and 31 on the members 26 and 27 bearing against the tapered surfaces of the sleeve sections 28 and 29, will operate to swage said sleeve inwardly, forming interior beads on said sleeve and corresponding grooves in the members 24 and 25 with which said beads will interlock, thus securing the connected members 24 and 25 against endwise movement relatively to the members of the coupling, substantially as in the preferred form of the device and in the manner desired.

It will be observed that it is especially desirable that the metal of the tapered locksleeve shall be of such hard character that when the coupling-members are screwed hard together the main body of the sleeve shall not be distorted but shall retain its original shape in order that it shall at all times firmly and squarely abut at its outer, larger end against the internal shoulder of the external coupling-member and thus insure the tapered edge of the sleeve being jammed directly and positively into the entrance-end of the internal coupling-member. It is desirable also that the metal of this lock-sleeve be of such bendable character that when it is thus jammed hard into locking position its forward thinned edge shall be bodily bent inwardly all around to form an annular bead which may form its own interlocking annular seat or groove in the coupled member. It is preferable also, in order that this interlocking action shall take place in the easiest and most effective manner, that the inner corner only of the entrance-end of the coupling-member shall bear upon the sleeve and that this point of contact be near the thinned edge of the sleeve, so that when the jamming action takes place the thinned extremity, and that portion only, of the sleeve shall be bent sharply inwardly into the body of the coupled member.

Obviously, my improved union or coupling is equally adapted for connecting or coupling a wire or cable to any desired structure or sections of a rod to each other, as for so connecting a pipe or the sections of a pipe.

I claim:—

1. In a coupling, the combination of coupling members provided with openings to receive the member to be coupled, means for forcing said coupling members together, a tapered sleeve of strong ductile material adapted to be placed over the members to be coupled between said coupling members, one of said coupling members being provided with an opening adapted to receive the small end of said tapered sleeve, said opening being slightly larger than the small end of said tapered sleeve so that the tapered surface of said sleeve will bear first against the edge of said opening at a short distance from its small end, whereby said ductile sleeve may be swaged inwardly to form a bead on said sleeve and a corresponding groove in said member to be coupled, with which said bead will interlock, thus securing said coupled member against movement relatively to the members of the coupling.

2. In a coupling, the combination of coupling members provided with openings to receive the member to be coupled, means for forcing said coupling members together, and a tapered sleeve of strong ductile material placed over the member to be coupled with its large end abutting against a rigid part of one of said coupling members, the other of said coupling members being provided with a recess slightly larger than the small end of said tapered sleeve, so that the tapered surface of said sleeve will bear against the edge of said recess a short distance from its small end, the edge of said recess being chamfered, whereby said ductile sleeve may be swaged inwardly to form a bead on said sleeve and a corresponding groove in said member to be coupled, with which said bead will interlock, thus securing said coupled member against endwise movement relatively to the members of the coupling.

3. In combination, a pair of tubular coupling-members threaded one into the other, the inner end of the inner coupling-member being annularly recessed and shouldered to receive the end of the member to be coupled, and a hard-metal sleeve inclosed within the coupling-members and tapered longitudinally to a bendable annular edge, the larger end of this sleeve abutting against the outer coupling-member and the thin tapered edge entering the recessed entrance end of the other member and having contact only with the inner annular corner thereof, for the purpose set forth.

4. In combination, a pair of tubular couplings and means for adjustably connecting them, one of the couplings being provided with an internal shoulder against which the coupled member abuts and with a flaring entrance end, and a hard-metal sleeve tapered forwardly to a thin bendable edge the larger end of this sleeve having abutment against one of the coupling members and its tapered end extending into the flared mouth of the other member and having an annular contact near its tapered end with the flared entrance end aforesaid, whereby when the coupling-members are drawn hard together the said thin bendable edge of the sleeve will be swaged inwardly to form an inwardly extending annular bead and a similarly shaped groove in the coupled member.

In testimony, that I claim the foregoing as my invention, I affix my signature in presence of two subscribing witnesses, this 10th day of January, A. D. 1908.

WALTER S. BURGESS.

Witnesses:
F. McMELES,
WILLIAM G. NOYES.